United States Patent [19]

Davidson

[11] Patent Number: 5,524,559
[45] Date of Patent: Jun. 11, 1996

[54] METHOD AND APPARATUS FOR SOWING SEED

[75] Inventor: Maxwell W. Davidson, Edinburgh, Great Britain

[73] Assignee: Maxwell Davidson Limited, Edinburgh, Great Britain

[21] Appl. No.: 256,404

[22] PCT Filed: Jan. 7, 1993

[86] PCT No.: PCT/GB93/00012

§ 371 Date: Aug. 29, 1994

§ 102(e) Date: Aug. 29, 1994

[87] PCT Pub. No.: WO93/13641

PCT Pub. Date: Jul. 22, 1993

[30] Foreign Application Priority Data

Mar. 25, 1991 [GB] United Kingdom ............... 9200189

[51] Int. Cl.⁶ .................................................. A01C 7/08
[52] U.S. Cl. ................... 111/200; 111/177; 111/900; 221/277; 221/278; 222/630
[58] Field of Search ....................... 111/200, 900, 111/173, 174, 177, 178, 179, 170; 221/278, 277; 222/630; 406/135, 136

[56] References Cited

U.S. PATENT DOCUMENTS

| 3,804,036 | 4/1974 | Seifert, Jr. ........................ 111/1 |
| 3,944,137 | 3/1976 | Cutchins et al. .................. 239/11 |
| 4,257,340 | 3/1981 | Mickelsson et al. |
| 4,300,461 | 11/1981 | Hodge et al. ..................... 111/8 |
| 4,614,283 | 9/1986 | Becker ............................ 221/278 |
| 4,899,672 | 2/1990 | Paul ............................... 111/174 |
| 5,241,917 | 9/1993 | Ferrand ........................... 111/200 X |

FOREIGN PATENT DOCUMENTS 1136771 12/1968 United Kingdom.
1379647 1/1975 United Kingdom.

OTHER PUBLICATIONS

DATABASE WPIL, Week 8908, Derwent Publications Ltd., London, GB; AN 89-059621 & SU-A-1-416209 (MOLD IRRIG VEGETABL).

Primary Examiner—Terry L. Melius
Assistant Examiner—Christopher J. Novosad
Attorney, Agent, or Firm—Kenyon & Kenyon

[57] ABSTRACT

A method of sowing seed (including fertilized pellets, particles, crystals and the like) including accelerating the seed to a speed in the supersonic range and directing the so moving seed to impinge on penetrable sowing ground so that the seed penetrates the ground to approximately the desired depth. The operation is carried out in a relatively low pressure environment and a feature of the operation is that the seed can penetrate the ground without substantial damage to the seed. Appropriate apparatus is provide to accelerate the seed to the supersonic speed range in a low pressure environment, and in one example this includes a rotor wheel receiving seed appropriately from a supply source, a sufficient rotary speed being imparted to the wheel for the necessary acceleration of the seed which is discharged via an outlet in the wheel. Alternative apparatus includes a low pressure fluid source for seed acceleration via a ducting system and in another example electrostatically charged seed is accelerated by an electrical conductor system.

12 Claims, 3 Drawing Sheets

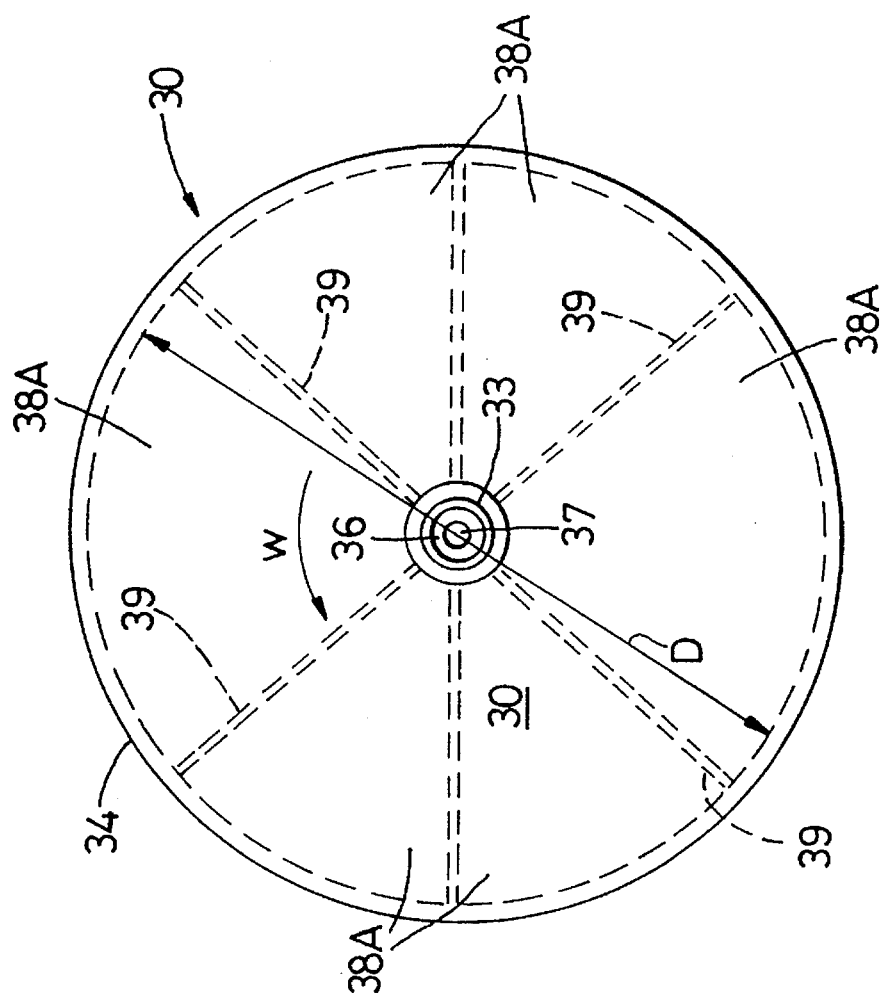
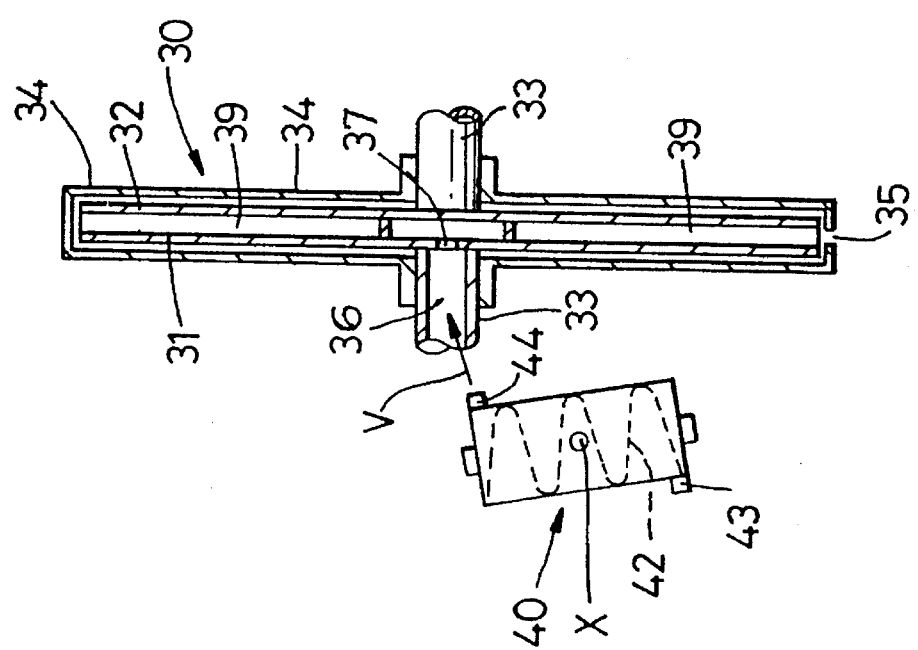
Fig.2
Fig.3

METHOD AND APPARATUS FOR SOWING SEED

The present invention relates to a method and apparatus or sowing seed and the like such as fertiliser pellets, particles, crystals, etc. (all referred to as seed for convenience).

U.K. Patent 1136771 describes a method of sowing seed comprising projecting seed into the ground at at least supersonic speed; this enables the seed to be sown quickly and conveniently, and the method dispenses with the need to plough or turn the soil before sowing, which is advantageous. The apparatus described in No. 1136771 for achieving this method comprises a seed discharging chamber including a discharge nozzle, the chamber receiving seed from a suitable seed storage container and a high pressure air source, e.g., compressor, is connected to the discharge chamber and selectively operable to cause expulsion of seed from the chamber via the nozzle. For controlled discharge of seed, the nozzle walls can be of flexible material and the throat of the nozzle of a size slightly smaller than a single seed, the high pressure air forcing seed individually through the flexible nozzle throat. To enable effective operation, the above apparatus has used air at a pressure of 180 p.s.i. This is disadvantageous due to the relatively high cost of providing a compressor to produce such high pressure, and it is also a serious drawback to deliver the seed prior no sowing into such a high pressure environment. It is the principal object of the present invention to obviate or mitigate these disadvantages.

According to one aspect of the present invention there is provided a method of sowing seed comprising accelerating the seed to impinge on penetrable ground at a speed in the supersonic range such that the seed penetrates the ground to a depth without substantial seed damage, wherein the seed is passed in a relatively low pressure environment of pressure no greater than 40 p.s.i. ($275.9$ Kn/m$^2$) gauge in an inlet passage, to means for accelerating the seed to a speed in the supersonic range in said low pressure environment.

According to a second aspect of the present invention there is provided apparatus for sowing seed by accelerating seed in a relatively low pressure environment no greater than 40 p.s.i ($275.9$ Kn/m$^2$) gauge to impinge on penetrable ground so that the seed penetrates the ground to a depth, said apparatus comprising a seed holding device including means to accelerate seed to a supersonic speed range and outlet means from the seed holding means for the discharge of seed onto the ground for penetration of the seed into the ground, and supply means to supply seed to said seed holding device wherein said seed holding device accelerates the seed by centrifugal force effect.

Embodiments of the present invention will now be described by way of example with reference to the accompanying drawings wherein:

FIG. 1 shows a schematic side elevation of one apparatus for carrying out the present invention while FIGS. 2 and 3 show side and end views respectively of apparatus in accordance with another embodiment of the invention.

Figure 1:
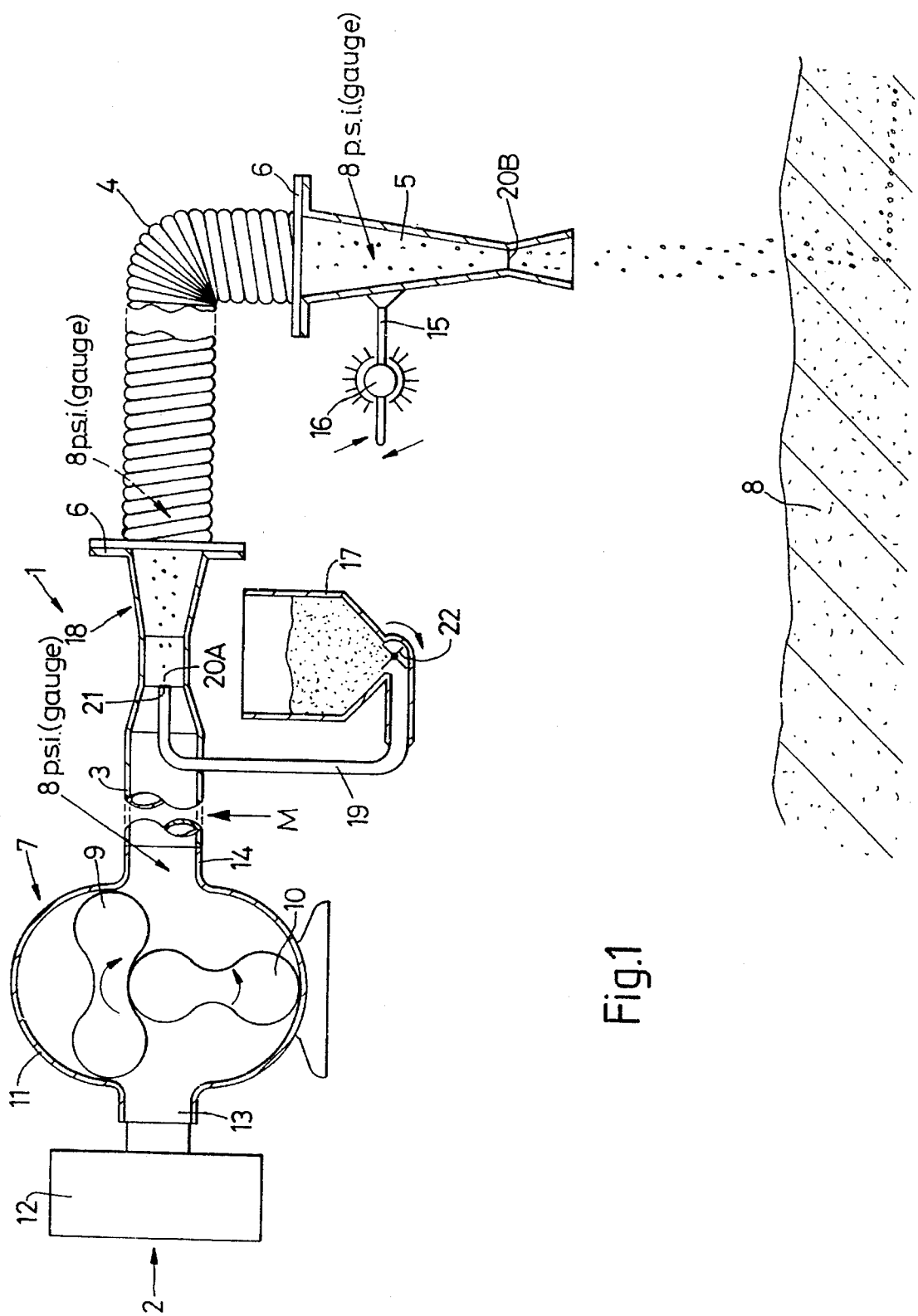

FIG. 1 shows seed sowing apparatus for carrying out the present invention. The seed sowing apparatus 1 include ducting 2 comprising an inlet section 3, flexible bellows section 4, and a nozzle discharge section 5 connected to the bellows section 4, the various sections being joined by bolting together flanged portions 6.

The nozzle section 5 is oscillable in a horizontal/transverse direction by means of a swinging lever 15 carried in ball joint 16 for effective spreading of seed over an area when the apparatus 1 is moved at an appropriate speed in a longitudinal direction.

A low pressure environment in the order of 8 p.s.i. (gauge) is maintained in the ducting 2 by means of an air blower 7 which is in the form of a positive displacement machine of the Roots type having meshing lobes 9, 10 located in housing 11, but other forms of blower are possible such as, for example, sliding vane or other centrifugal blowers. The blower 7 is preferably driven from a tractor power take-off, and an air filter 12 is provided at the blower inlet 13, the blower discharge 14 being connected to ducting inlet section 3.

Seed is stored in an open topped hopper container 17, and to enable seed to be drawn into the ducting 2, the inlet section 3 includes a venturi 18, a delivery conduit 19 leading from the bottom of the container 17 and having an outlet 21 discharging axially into throat 20A of the venturi 18. The container 17 includes a controlled rotor valve 22 at the bottom: this valve in a modified embodiment of the present invention can be incorporated directly into the air delivery tube between the blower 7 and the nozzle 5 having a throat 20B. The venturi throat 20A is placed in sub-atmospheric pressure conditions and seed is ingested into the throat from the container 17 which is at atmospheric pressure, so that a fairly even flow of seed is delivered to the nozzle section 5.

It has been found than the flow of air created by blower 7 at the relatively low pressure value of 8 p.s.i. is sufficient for the provision of seed discharge at the nozzle section 5 at a speed (supersonic) to enable a desired depth of penetration of the seed into the soil 8. This is in marked contrast no the previous pressure of 190 p.s.i., and this enables a relatively less costly blower or compressor to be used. Also, as will be appreciated, the relatively lower pressure environment in ducting 2 will be less harmful to the seed which is to be sown. Also, it is possible for the throat 22 of nozzle section 5 to have a width substantially greater than the seed diameter, and in particular this throat width can be approximately three times the seed diameter. This is also beneficial to the prior-to-sowing condition of the seed. The seed can he suitably treated prior to supply to sowing apparatus 1, in the way described in prior U.K. Patent 1136771.

The apparatus 1 may be carried by a specially designed trolley, or, alternatively, could be adapted for carrying by a tractor. In particular, existing coulter type cereal seed drills could be fairly readily adapted no embody the seed sowing system of the present invention. Additionally, the blower 7 could supply air to a manifold at M delivering to a plurality of ductings 2.

Provision may be made to incorporate a volume capacitance chamber between venturi 18 and ducting 4 for the purpose of smoothing out any variations in seed-to-air ratio caused by the fluctuation in seed feed rate inherent with rotor valve 22, which valve is separately driven at a controllable rate.

Figure 4:
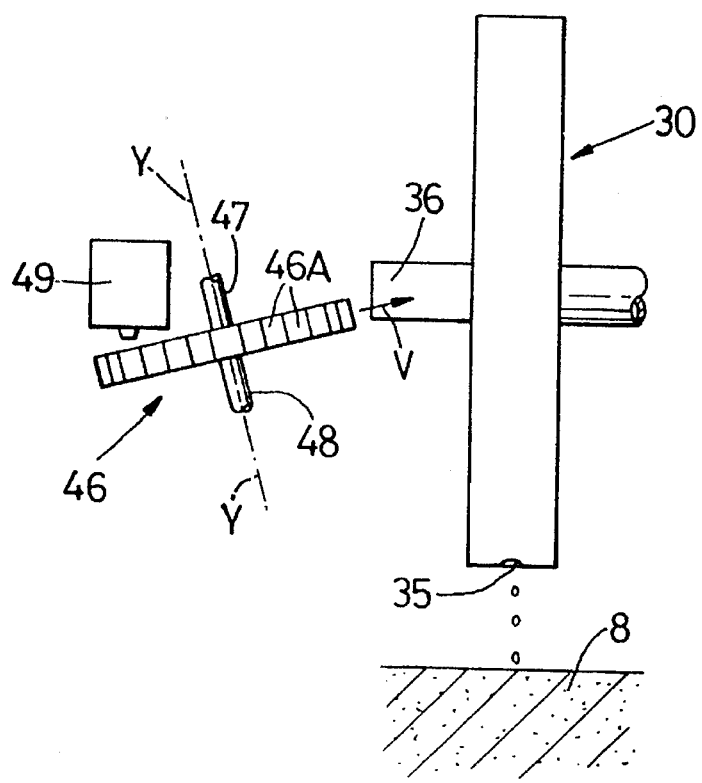
FIG. 4 shows the apparatus of FIGS. 2/3 but with a modification.

FIGS. 2 and 3 show an alternative apparatus for carrying out the present invention in the form of a hollow wheel 30 which is mounted for rotation and which is characterised by having two flat metal or metal reinforced plastic plates 31, 32 spaced close together on the same rotating shaft 33 of the wheel 30, the plates 31, 32 being of such outside diameter D and rotational speed as to cause the wheel peripheral velocity to be in the neighbourhood of 350 meters per second or above. The wheel 30 is housed in a suitably shaped cowl or casing 34 to divert and direct the seeds leaving the periphery of the wheel at the resultant velocity and direction downwards towards the ground to impinge at more than the speed of sound in air for this purpose the cowl having outlet 35. A supply means 40 delivers seed to an inlet duct 36, whereby regular and measured supplies of seed are supplied into an axial central aperture 37 of the hollow wheel 30 at precise instants of time and in the required position relative to the delivery cowl 34 aforementioned and at a predetermined adjustable vector V in velocity and direction. Suitable drive means (not shown) are provided for the wheel 30. In FIGS. 2/3, the seed supply means 40 comprise a screw device including a screw 42 receiving seed via an inlet 43 and discharging seed via an outlet 44, the device being swingable about an axis X (out of the plane of the paper is FIG. 3) for angular setting of the device to produce the desired vector V. Also, the rotor wheel 30 includes radial plates or vanes 39 (forming an annular series of open ended chambers 38A) to assist the acceleration of the seed. Thus, seeds (including fertiliser pellets, particles, crystals, etc.) are accelerated to supersonic velocity by feeding them into the axial centre of the rotating wheel 30 from whence they are discharged into the ground appropriately. One advantage of using this apparatus for achieving the invention lies in the absence of a compressor (seed being discharged in a low pressure environment), thereby resulting in lower energy costs and little or no soil disturbance by discharging air. An alternative seed supply means 46 is shown in FIG. 4 comprising a rotary wheel supported by axles 47, 48 so as to rotate about axis Y, the wheel including compartments 46A to receive seed from a suitable source, e.g., hopper 49, and an appropriate casing (not shown) can be provided for the wheel. Seed is discharged from compartment 46A of the spinning wheel 46 into the inlet 36 to provide the desired seed direction/speed vector V: the orientation of the axis Y can be changed to give a different direction vector while the wheel rotation speed dictates the seed discharge speed (i.e., the magnitude of the vector). The wheel 46 and the screw device 40, like the rotor wheel 30, can be driven from any suitable source, for example, from a tractor power take-off. The supply devices 40, 46 may supply 2000 seeds/second at a velocity of 30 meters/second.

Figure 5:
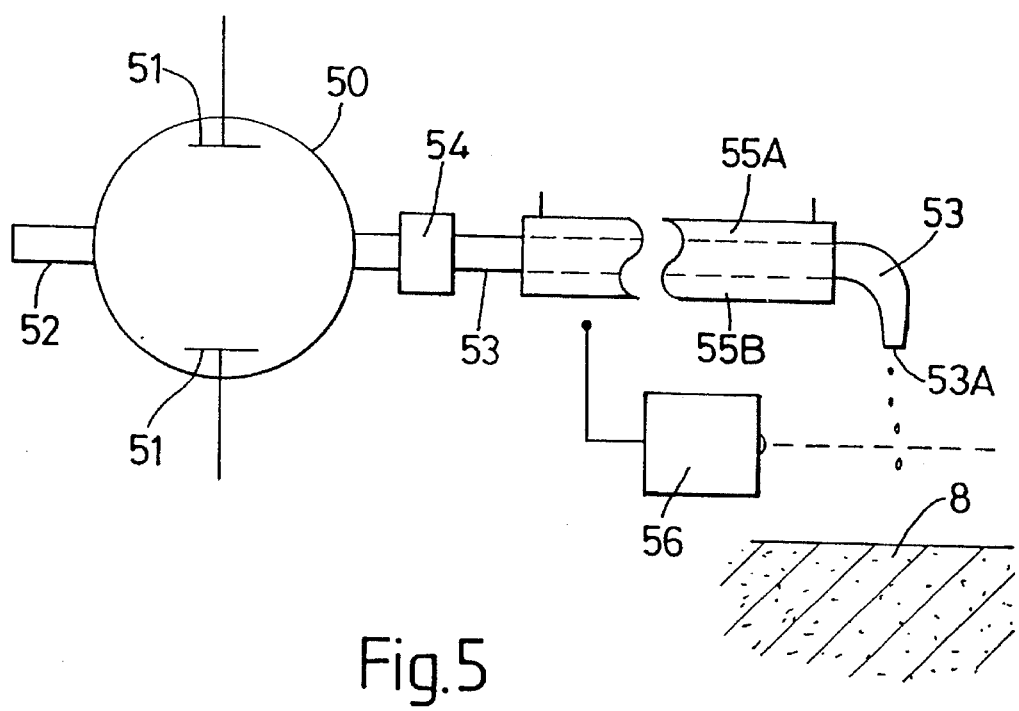
FIG. 5 shows schematically a further embodiment for carrying out the present invention.

Referring to FIG. 5 in a further embodiment of this invention, seeds are accelerated to supersonic velocity by an apparatus comprising electrostatic means as follows: Seeds are first given an electrostatic charge of known polarity in a charging chamber 50 having electrodes 51 such than they are attracted by charged plane type conductors 55A, 55B of opposite polarity arranged in a finite series on a given axis, each charged conductor increasing the attractive forces operating on the seeds until the required supersonic velocity is achieved. Seed is supplied to the charger 50 via an inlet 52 while the conduit 53 leads the seed (via the conductors 55A, 55B) to a discharge outlet 53A, and an inducer 54, e.g., fan can be fitted in the conduit 53 to create at least initially a flow of electrostatically charged seed from the charger 50 to the conductors 55A, 55B. The apparatus can be arranged to divert and direct the seeds to the required impact positions on the seed bed, ground or soil by combination of electrostatically charged conductors operating as scanning devices (similar to those operating in a cathode ray tube with electron beams).

Yet a further embodiment utilises a positional radio wave detector 56 which will track the actual movement of seed or seeds and ensure that seeds are sown supersonically in definite locations within the field, seed bed, etc., by replacing seeds by others when a seed has failed to reach or has been diverted from the required location.

It will be possible for seeding machines operating in accordance with the last embodiment to be subject to satellite navigational guidance to complete the appropriate supersonic sowing of areas precisely and with individual seeds precisely located in pre-planned positions.

Modifications are, of course, possible. In particular, the seed supply means to the rotor wheel 30 could take some other form than the described supply devices 40, 46, and the wheel 30 could be arranged differently, for example, the plates 39 could be modified or even dispensed with.

I claim:

1. A method of sowing seed comprising accelerating the seed to impinge on penetrable ground at a speed in the supersonic range such that the seed penetrates the ground to a depth without substantial seed damage, wherein the seed is passed in a relatively low pressure environment of pressure no greater than 40 p.s.i. (275.9 Kn/m$^2$) gauge in an inlet passage to means for accelerating the seed to a speed in the supersonic range in said low pressure environment.

2. A method as claimed in claim 1, wherein acceleration of the seed is achieved by a low pressure source of fluid.

3. A method as claimed in claim 2, wherein the low pressure fluid, for example, air, has a pressure of approximately 8 p.s.i. (55.16 Kn/m$_2$).

4. A method as claimed in claim 1, wherein the seed is accelerated to the supersonic speed range by imparting a centrifugal force on the seed.

5. Apparatus for sowing seed by accelerating seed in a relatively low pressure environment no greater than 40 p.s.i (275.9 Kn/m$^2$) gauge to impinge on penetrable ground so that the seed penetrates the ground to a depth, said apparatus comprising a seed holding device, including means to accelerate seed to a supersonic speed range and outlet means from the seed holding device for the discharge of seed onto the ground for penetration of the seed into the ground, and supply means to supply seed to said seed holding device, wherein said seed holding device accelerates the seed by centrifugal force effect.

6. Apparatus as claimed in claim 5, wherein said seed holding device comprises a rotor.

7. Apparatus as claimed in claim 6, wherein the rotor comprises a pair of closely spaced plates defining annular chamber means, seed being supplied to a central zone of said annular chamber means.

8. Apparatus as claimed in claim 7, wherein said rotor is housed in a stationary casing provided with outlet means for the accelerated seed.

9. Apparatus as claimed in claim 7, wherein a series of radial plates are provided between the rotor plate pair to define an annular series of chambers each open at its outer end.

10. Apparatus as claimed in claim 6, wherein supply means supply seed to an axial inlet of the rotor at a predetermined vector which is adjustable both in velocity and direction.

11. Apparatus as claimed in claim 10, wherein the supply means comprise a feed device having an inlet and an outlet discharging into the axial inlet of the rotor, said feed device being adjustable to provide said adjustable vector.

12. Apparatus as claimed in claim 10, wherein the supply means comprises a rotary wheel device.

\* \* \* \* \*

UNITED STATES PATENT AND TRADEMARK OFFICE
CERTIFICATE OF CORRECTION

PATENT NO. : 5,524,559
DATED : June 11, 1996
INVENTOR(S) : Maxwell W. Davidson

It is certified that error appears in the above-indentified patent and that said Letters Patent is hereby corrected as shown below:

| Column | Line | |
|--------|------|---|
| 2 | 49 | Change "no" to --to--. |
| 3 | 46 | Change "such than" to --such that--. |

Signed and Sealed this

First Day of October, 1996

Attest:

BRUCE LEHMAN

Attesting Officer     Commissioner of Patents and Trademarks